US008490372B2

(12) United States Patent  (10) Patent No.: US 8,490,372 B2
Paquette  (45) Date of Patent: Jul. 23, 2013

(54) ROBOTIC TREE TRIMMER

(76) Inventor: Michel Paquette, St-Etienne-des-Grès (CA)

( * ) Notice: Subject to any disclaimer, the term of this patent is extended or adjusted under 35 U.S.C. 154(b) by 30 days.

(21) Appl. No.: 13/161,745

(22) Filed: Jun. 16, 2011

(65) Prior Publication Data

US 2011/0308215 A1 Dec. 22, 2011

(30) Foreign Application Priority Data

Jun. 16, 2010 (GB) .................................. 1010092.3

(51) Int. Cl.
A01G 3/04 (2006.01)
(52) U.S. Cl.
USPC ............................................. 56/237; 56/233
(58) Field of Classification Search
USPC ........... 56/233–237; 144/335–343, 34.1–34.6
See application file for complete search history.

(56) References Cited

U.S. PATENT DOCUMENTS

| 424,803 | A | | 4/1890 | Lowell | |
|---|---|---|---|---|---|
| 2,953,229 | A | * | 9/1960 | Wiegel | 193/7 |
| 3,087,296 | A | * | 4/1963 | Cowles | 56/10.7 |
| 3,214,895 | A | * | 11/1965 | Leydig et al. | 56/235 |
| 3,496,709 | A | | 2/1970 | Lawrence | |
| 3,888,071 | A | | 6/1975 | Wallace | |
| 3,913,304 | A | | 10/1975 | Jodoin | |
| 4,333,266 | A | * | 6/1982 | Babo | 47/58.1 R |
| 4,355,497 | A | | 10/1982 | Murphy | |
| 4,383,401 | A | * | 5/1983 | Lessard et al. | 56/236 |
| 4,887,417 | A | * | 12/1989 | Parsons, Jr. | 56/15.2 |
| 5,722,223 | A | | 3/1998 | Walton | |
| 5,782,072 | A | * | 7/1998 | Matthews | 56/10.2 F |
| 7,204,072 | B2 | * | 4/2007 | Joy et al. | 56/233 |

* cited by examiner

Primary Examiner — Alicia Torres

(57) ABSTRACT

A robotic tree trimmer has a hydraulic system adapted to be mounted to a tractor and comprising an extendible vertical mast. A first hydraulic motor attached to the vertical mast and adapted to linearly extend and rotate the vertical mast 180 degrees around a first vertical axis. An extendible horizontal boom attached to a distal top end of the vertical mast and having an extension member on an end opposite the distal top end of the vertical mast; a second hydraulic motor attached to the extension member and used to rotate a trimming apparatus 360 degrees around a second vertical axis variably spaced from the first vertical axis by the extendible horizontal boom.

9 Claims, 4 Drawing Sheets

ROBOTIC TREE TRIMMER

FIELD OF THE INVENTION

The present invention relates generally to mechanical equipment but more particularly to a mechanical/robotic tree trimmer.

BACKGROUND OF THE INVENTION

There are many types of trimmers for hedges, bushes and decorative trees such as Christmas trees. These trimmers have varying degrees of automatic controls. From the hand held trimmer all the way to more sophisticated computer controlled "robotic" trimmers.

SUMMARY OF THE INVENTION

In view of the foregoing disadvantages inherent in the known devices now present in the prior art, the present invention, which will be described subsequently in greater detail, is to provide objects and advantages which are:

To provide for a rapid and precise cutting of Christmas trees.

To attain these ends, the present invention generally comprises a hydraulic system adapted to be mounted to a tractor and comprising an extendible vertical mast. A first hydraulic motor attached to the vertical mast and adapted to linearly extend and rotate the vertical mast 180 degrees around a first vertical axis. An extendible horizontal boom attached to a distal top end of the vertical mast and having an extension member on an end opposite the distal top end of the vertical mast; a second hydraulic motor attached to the extension member and used to rotate a trimming apparatus 360 degrees around a second vertical axis variably spaced from the first vertical axis by the extendible horizontal boom. The trimming apparatus including a trimming member and a hydraulic piston that is attached between the trimming member and the extension member at a position that is spaced from the connection between the second hydraulic motor and the trimming member to thereby provide the ability to pivot and adjust the angle of the trimming member with respect to the horizontal boom, such that the trimming member can be moved in a variety of positions, angles, heights in order to trim trees of varying positions and sizes in a variety of desired shapes.

The robotic tree trimmer has a substantially flat and linearly extending cutting member.

The robotic tree trimmer also includes a control center operating and controlling the first and second hydraulic motors.

The robotic tree trimmer has the control center include a computer member having operating software.

In combination with a tractor, or equivalent piece of machinery, and the robotic tree trimmer, the tractor includes a front end, and the robotic tree trimmer is removably attached to the front end of the tractor and comprises a hydraulic system adapted to be mounted to a tractor and comprising an extendible vertical mast; a first hydraulic motor attached to the vertical mast and adapted to linearly extend and rotate the vertical mast 180 degrees around a first vertical axis. An extendible horizontal boom attached to a distal top end of the vertical mast and having an extension member on an end opposite the distal top end of the vertical mast.

A second hydraulic motor attached to the extension member and used to rotate a trimming apparatus 360 degrees around a second vertical axis variably spaced from the first vertical axis by the extendible horizontal boom. The trimming apparatus includes a trimming member and a hydraulic piston that is attached between the trimming member and the extension member at a position that is spaced from the connection between the second hydraulic motor and the trimming member to thereby provide the ability to pivot and adjust the angle of the trimming member with respect to the horizontal boom, such that the trimming member can be moved in a variety of positions, angles, heights in order to trim trees of varying positions and sizes in a variety of desired shapes.

The robotic tree trimmer and tractor have a method of operation including the steps of:

a. providing the tractor and robotic tree trimmer;
b. positioning the tractor proximal a chosen tree;
c. using the first hydraulic motor to adjust the height and rotational angle of the vertical mast appropriately with respect to the chosen tree;
d. using the extension member to extend the horizontal boom so that the trimming apparatus is positioned directly above the top of the chosen tree;
e. using the hydraulic piston to position the trimming member at an appropriate angle to the chosen tree;
f. using the second hydraulic member to rotate the trimming member 360 degrees around the chosen tree, and using the trimming member to trim the chosen tree to the desired shape;
g. using the first hydraulic motor to adjust the height and rotational angle of the vertical mast appropriately with respect to the chosen tree in order to displace the tractor and robotic tree trimmer from the chosen tree;
h. choosing another tree and repeating steps a. through g.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION OF THE PREFERRED EMBODIMENT

Figure 1:
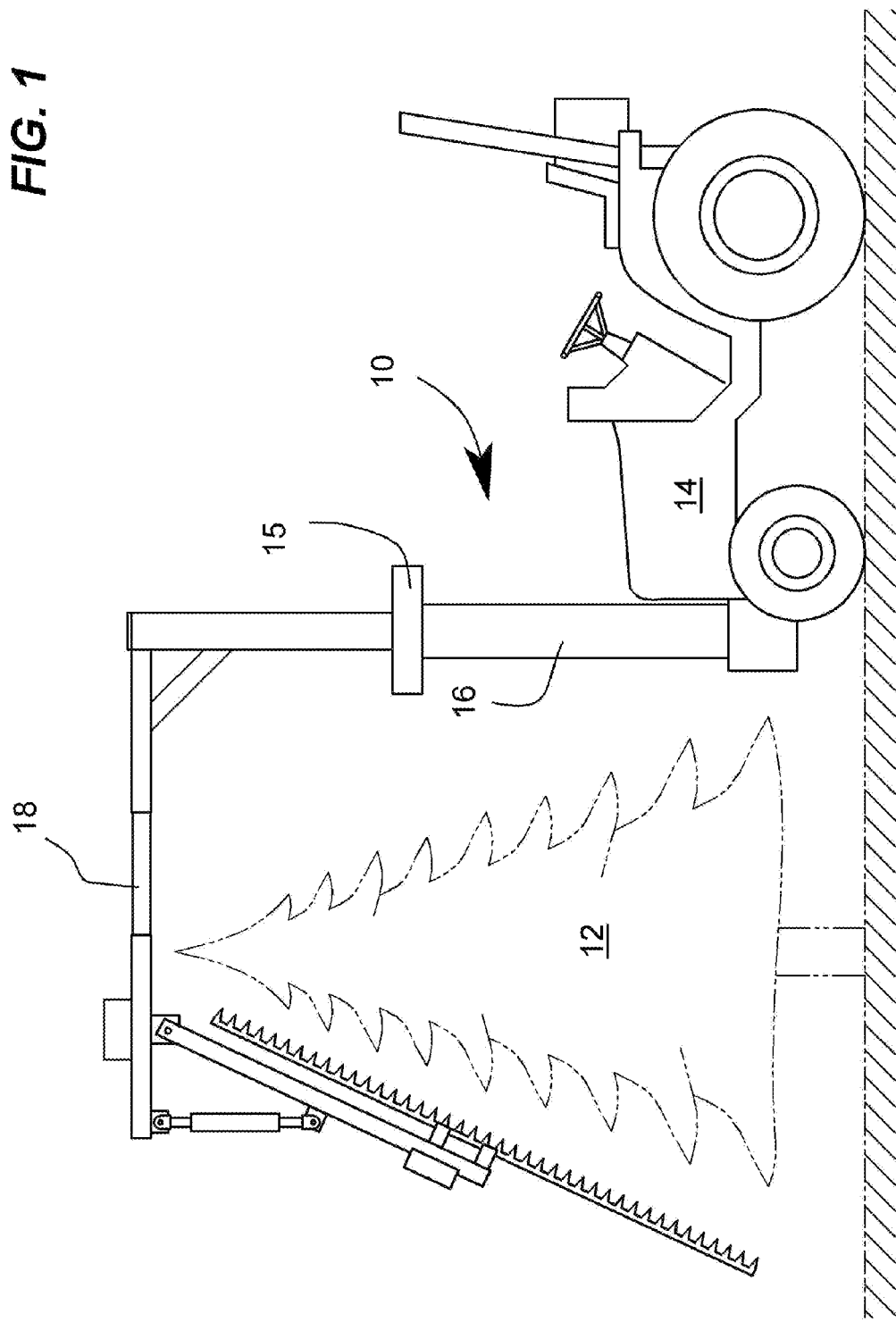
FIG. 1 Side view of the invention.
Figure 2:
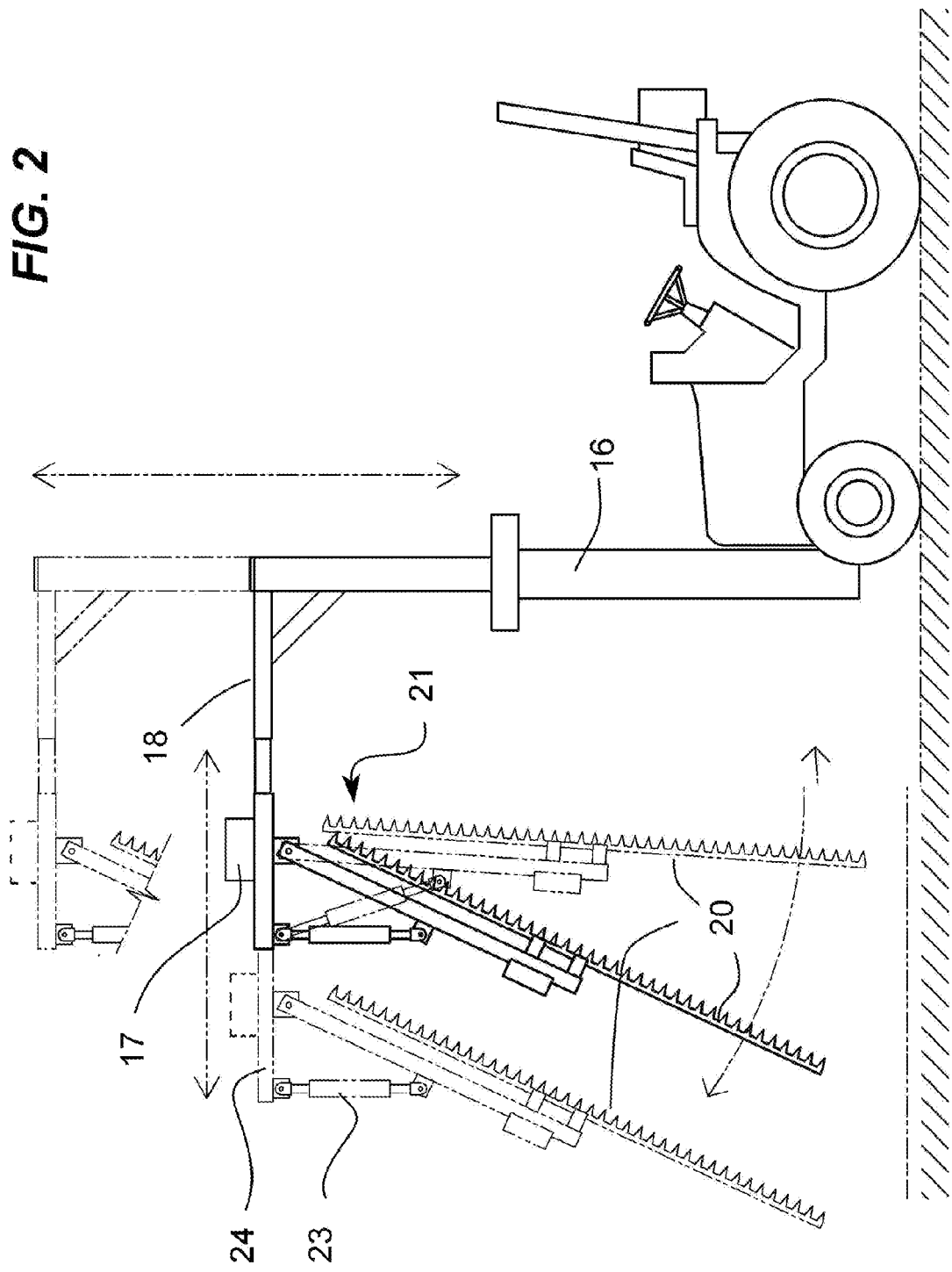
FIG. 2 Side view detail of the boom and angularly adjustable trimmer.
Figure 3:
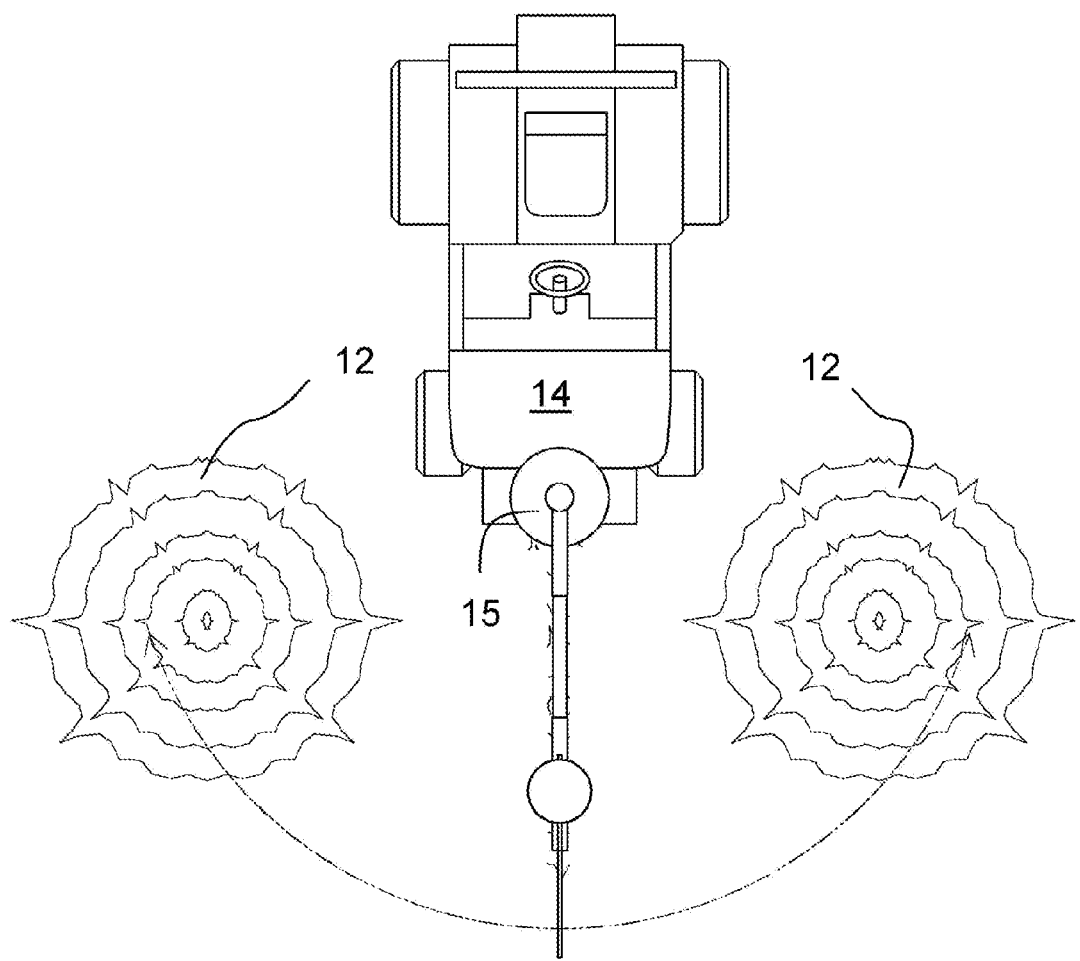
FIG. 3 Top view of the invention with trees located on each sides.
Figure 4:
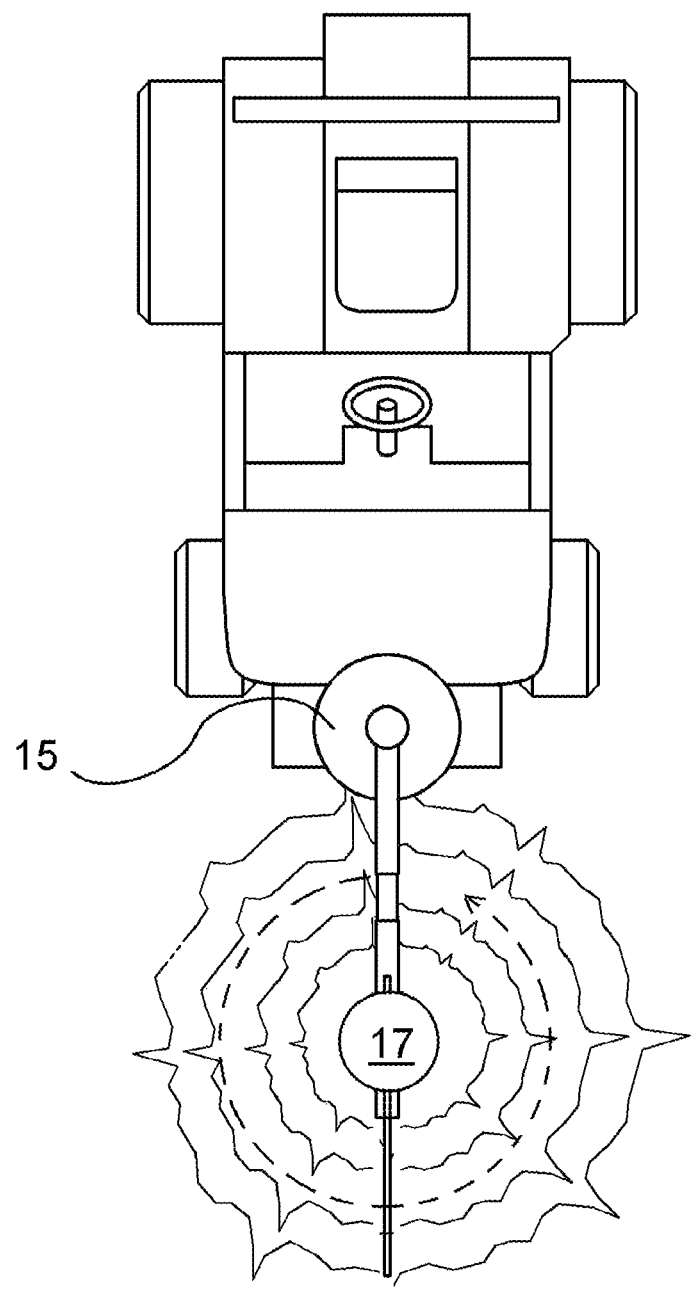
FIG. 4 Top view of the invention with a tree in front and trimming 360 degrees.

A robotic tree trimmer (10) has a hydraulic system (not shown) mounted on a tractor (14) so as to power the robotic tree trimmer (10). A first hydraulic motor (15) is used for rotating an extendible vertical mast (16) 180 degrees so that it can trim a tree (12) to the left as well as to the right of the tractor (14), as seen in FIG. 3. It should be understood that decorative trees (12) are planted in rows, such as seen, for example, in FIG. 3 in order to facilitate trimming and harvesting by mechanical equipment.

Since trees (12) start out small and grow, the vertical mast (16) is vertically extendible to account for the varying heights of the trees (12).

Extending perpendicularly from the vertical mast (16) is an extendible horizontal boom (18). Evidently, as a tree (12) grows taller, it also grows wider, hence the need for a horizontal boom (18) that is extendible so that a trimmer (20) can be properly positioned.

A second hydraulic motor (17) located on the horizontal boom (18) rotates a trimming apparatus (21) 360 degrees so that it can trim the entire contour of the tree (12). The trimming apparatus (21) comprises the trimmer (20) and a hydraulic piston (23) both suspended from an extension member (24) extending from the horizontal boom (18). The angle of the trimmer (20) is adjusted by way of the hydraulic piston (23).

Both the first and second hydraulic motors (15,17) work using principles known in the art such as hydraulic lines and a compressor, both provided by the tractor (14). Preferably, a system operated by a computer and software combination and which could have various positions in memory so that the trimmer (10) can be oriented in such a way as to give the proper cut. The system also has manual controls operated by the tractor (14) operator who is generally skilled in the art of operating hydraulic equipment.

In use, the tractor (14) is positioned proximal a tree (12) and the vertical mast (16) is adjusted for height and is rotated by way of the first hydraulic motor (15), then the extension member (24) is extended so that the trimming apparatus (21) is located directly above the top of the tree (12) to be trimmed and configured to the diameter of the tree (12) to be trimmed. Finally, the angle of the trimmer (20) is adjusted by way of the hydraulic piston so that the tree (12) can be trimmed to the desired shape by rotating the trimming apparatus (21) 360 degrees by way of the second hydraulic motor (17).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A robotic tree trimmer comprising a hydraulic system adapted to be mounted to a tractor and comprising an extendible vertical mast;
a first hydraulic motor attached to said vertical mast and adapted to linearly extend and rotate said vertical mast 180 degrees around a first vertical axis;
an extendible horizontal boom attached to a distal top end of said vertical mast and having an extension member on an end opposite said distal top end of said vertical mast;
a second hydraulic motor attached to said extension member and used to rotate a trimming apparatus 360 degrees around a second vertical axis variably spaced from said first vertical axis by said extendible horizontal boom;
said trimming apparatus including a trimming member and a hydraulic piston that is attached between said trimming member and said extension member at a position that is spaced from the connection between said second hydraulic motor and said extension member to thereby provide the ability to pivot and adjust the angle of said trimming member with respect to said horizontal boom, such that said trimming member can be moved in a variety of positions, angles, heights in order to trim trees of varying positions and sizes in a variety of desired shapes.

2. The robotic tree trimmer of claim 1, wherein said said trimming member has a substantially flat and linearly extending cutting member.

3. The robotic tree trimmer of claim 1, further including a control center operating and controlling said first and second hydraulic motors.

4. The robotic tree trimmer of claim 3, wherein said control center includes a computer member having operating software.

5. The combination of a tractor and a robotic tree trimmer, said tractor including a front end, and said robotic tree trimmer removably attached to said front end of said tractor and comprising a hydraulic system adapted to be mounted to said tractor and comprising an extendible vertical mast; a first hydraulic motor attached to said vertical mast and adapted to linearly extend and rotate said vertical mast 180 degrees around a first vertical axis; an extendible horizontal boom attached to a distal top end of said vertical mast and having an extension member on an end opposite said distal top end of said vertical mast; a second hydraulic motor attached to said extension member and used to rotate a trimming apparatus 360 degrees around a second vertical axis variably spaced from said first vertical axis by said extendible horizontal boom; said trimming apparatus including a trimming member and a hydraulic piston that is attached between said trimming member and said extension member at a position that is spaced from the connection between said second hydraulic motor and said extension member to thereby provide the ability to pivot and adjust the angle of said trimming member with respect to said horizontal boom, such that said trimming member can be moved in a variety of positions, angles, heights in order to trim trees of varying positions and sizes in a variety of desired shapes.

6. The combination of claim 5, wherein said trimming member has a substantially flat and linearly extending cutting member.

7. The combination of claim 5, further including a control center operating and controlling said first and second hydraulic motors.

8. The combination of claim 7, wherein said control center includes a computer member having operating software.

9. A method of trimming trees including the steps of:
a. providing the combination tractor and robotic tree trimmer of claim 5;
b. positioning the tractor proximal a chosen tree;
c. using said first hydraulic motor to adjust the height and rotational angle of said vertical mast appropriately with respect to said chosen tree;
d. using said extension member to extend said horizontal boom so that said trimming apparatus is positioned directly above the top of said chosen tree;
e. using said hydraulic piston to position said trimming member at an appropriate angle to said chosen tree;
f. using said second hydraulic motor to rotate said trimming member 360 degrees around said chosen tree, and using said trimming member to trim said chosen tree to the desired shape;
g. using said first hydraulic motor to adjust the height and rotational angle of said vertical mast appropriately with respect to said chosen tree in order to displace said tractor and robotic tree trimmer from said chosen tree;
h. choosing another tree and repeating steps a. through g.

\* \* \* \* \*